US008047301B2

(12) United States Patent
Friggstad et al.

(10) Patent No.: US 8,047,301 B2
(45) Date of Patent: Nov. 1, 2011

(54) DISC GANG ASSEMBLY FOR AN AGRICULTURAL IMPLEMENT

(75) Inventors: Terrance A. Friggstad, Grasswood (CA); Robin B. Schilling, Darfield (CA); Matthew S. Naylor, Saskatoon (CA)

(73) Assignee: CNH Canada, Ltd. (CA)

( * ) Notice: Subject to any disclaimer, the term of this patent is extended or adjusted under 35 U.S.C. 154(b) by 0 days.

(21) Appl. No.: 12/493,745

(22) Filed: Jun. 29, 2009

(65) Prior Publication Data

US 2010/0096149 A1  Apr. 22, 2010

Related U.S. Application Data

(60) Provisional application No. 61/106,370, filed on Oct. 17, 2008.

(51) Int. Cl.
*A01B 39/08* (2006.01)
(52) U.S. Cl. ........ 172/574; 111/163; 172/773; 172/762; 172/538
(58) Field of Classification Search ............... 172/145, 172/148, 149, 151, 538, 574, 762, 773; 111/52, 111/61, 62, 73, 77, 85, 149, 152, 153, 157, 111/163, 164, 165, 166, 167, 16, 169
See application file for complete search history.

(56) References Cited

U.S. PATENT DOCUMENTS

| 359,832 A | 3/1887 | Arnett | |
|---|---|---|---|
| 2,277,622 A * | 3/1942 | White | 111/169 |
| 2,729,929 A | 1/1956 | Mason | |
| 3,398,707 A | 8/1968 | McClenny | |
| 4,077,478 A * | 3/1978 | Neukom | 172/267 |
| 4,275,670 A | 6/1981 | Dreyer | |
| 4,366,760 A | 1/1983 | Dreyer | |
| 4,407,207 A | 10/1983 | Dreyer | |
| 4,594,951 A | 6/1986 | Grataloup | |
| 4,750,440 A * | 6/1988 | Pollard et al. | 111/151 |
| 4,750,441 A * | 6/1988 | Pfenninger et al. | 111/135 |
| 5,065,681 A * | 11/1991 | Hadley | 111/55 |
| 5,074,227 A * | 12/1991 | Schwitters | 111/137 |
| 5,154,240 A * | 10/1992 | Carrick | 172/311 |
| 5,335,610 A * | 8/1994 | Weber | 111/136 |
| 5,477,792 A * | 12/1995 | Bassett et al. | 111/121 |
| 5,595,130 A * | 1/1997 | Baugher et al. | 111/52 |
| 5,687,798 A * | 11/1997 | Henry et al. | 172/311 |
| 5,709,271 A * | 1/1998 | Bassett | 172/4 |
| 5,785,129 A * | 7/1998 | Keller et al. | 172/536 |
| 5,794,711 A * | 8/1998 | Slattery | 172/265 |
| 5,802,995 A * | 9/1998 | Baugher et al. | 111/52 |
| 5,809,914 A * | 9/1998 | Follmer | 111/56 |

(Continued)

FOREIGN PATENT DOCUMENTS

EP  0117745  9/1984

(Continued)

*Primary Examiner* — Thomas Will
*Assistant Examiner* — Jamie L McGowan
(74) *Attorney, Agent, or Firm* — Rebecca Henkel; Sue Watson

(57) ABSTRACT

A disc gang for use with an agricultural implement includes a pair of front and a pair of rear disc openers mounted to a carrier boom by a mounting arm that can be independently raised and lowered as desired. The front and rear disc openers are mounted such that the openers can oscillate in response to surface undulations independently of one another. Moreover, the disc openers of each pair are free to oscillate in response to surface contours independently of one another.

12 Claims, 8 Drawing Sheets

U.S. PATENT DOCUMENTS

| | | | |
|---|---|---|---|
| 5,957,217 A | 9/1999 | Gunnink | |
| 6,148,747 A | 11/2000 | Deckler et al. | |
| 6,575,104 B2 * | 6/2003 | Brummelhuis | 111/139 |
| 6,886,641 B2 * | 5/2005 | Ronald et al. | 172/134 |
| 7,044,070 B2 | 5/2006 | Kaster et al. | |
| 7,216,596 B2 | 5/2007 | Jones | |
| 7,387,077 B1 * | 6/2008 | Truax et al. | 111/135 |
| 7,464,767 B2 * | 12/2008 | Schilling | 172/604 |
| 2002/0166486 A1 * | 11/2002 | Prairie et al. | 111/200 |
| 2003/0015328 A1 * | 1/2003 | Prairie et al. | 172/558 |
| 2004/0016554 A1 * | 1/2004 | McDonald | 172/146 |
| 2006/0102058 A1 * | 5/2006 | Swanson | 111/119 |
| 2008/0295750 A1 * | 12/2008 | Gregor | 111/164 |
| 2009/0114407 A1 * | 5/2009 | Swanson | 172/527 |
| 2009/0158981 A1 * | 6/2009 | Jagow et al. | 111/163 |

FOREIGN PATENT DOCUMENTS

FR     2554307     5/1985

* cited by examiner

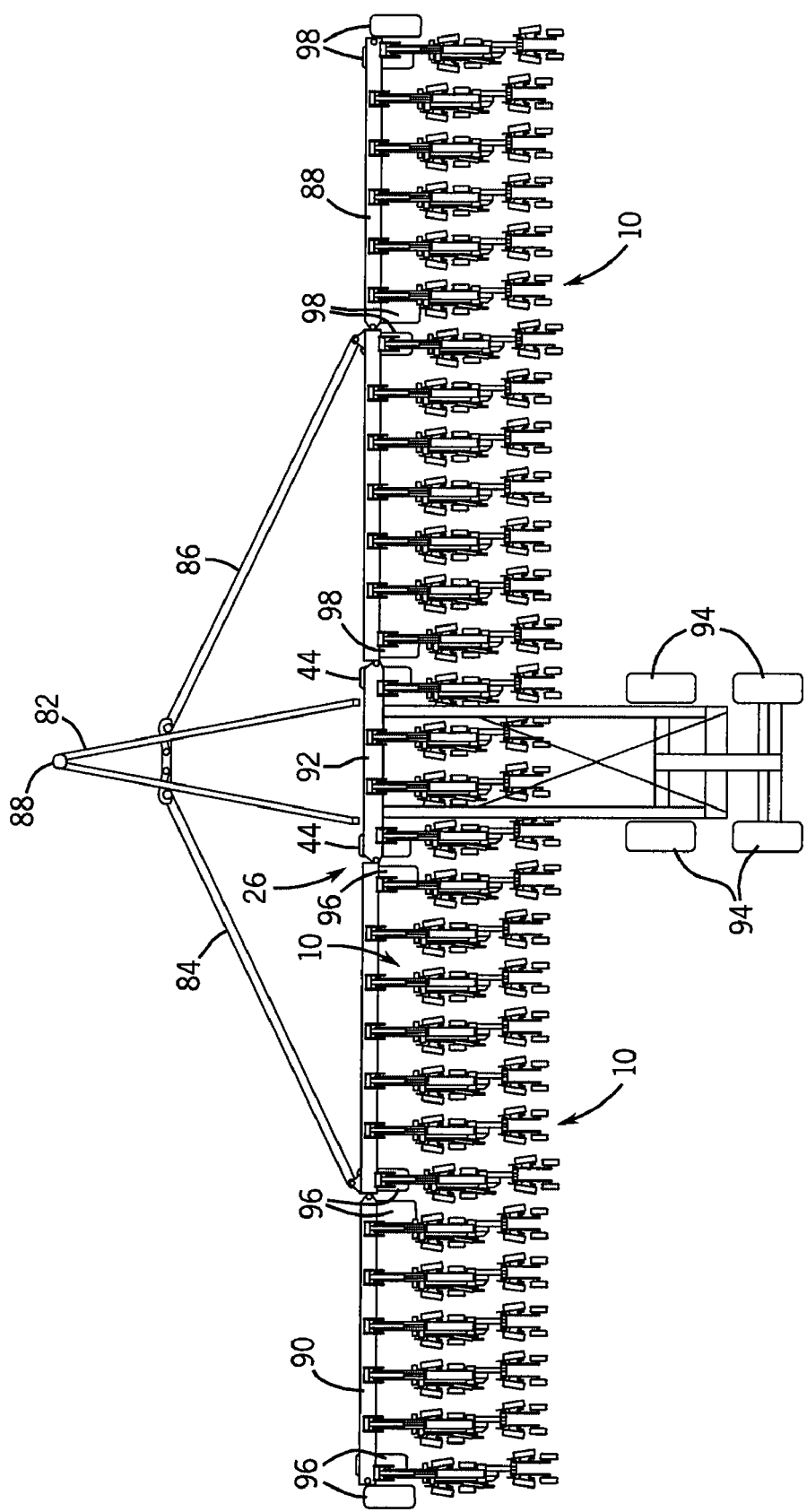

DISC GANG ASSEMBLY FOR AN AGRICULTURAL IMPLEMENT

CROSS-REFERENCE TO RELATED APPLICATION

The present application claims the benefit of U.S. Ser. No. 61/106,370, filed Oct. 17, 2008.

BACKGROUND OF THE INVENTION

Disc openers are commonly used with agricultural and farming equipment to furrow and thus ready a planting surface for seed and fertilizer. Increasingly, single disc openers are being used in place of conventional double disc openers as single disc openers have been found to be more effective in cutting through heavy residue compared to its double disc opener counterpart. Further, the number of rotating disc openers to service and otherwise maintain is less than that of double disc openers.

Notwithstanding the above, and other, advantages of single disc openers, there are still areas for potential improvement for such openers. For example, due to the excessive residue generally encountered with single disc openers which are used directly with the previous season's stubble, e.g., residue, additional spacing is needed between adjacent disc openers, which often requires additional ranks. The additional space further requires more vertical range of movement for the disc openers to accommodate a greater vertical operation due to significant surface undulations that may be encountered.

For conventional single disc openers, the seed delivery channels are typically arranged slightly behind the center of the disc opener at the soil cut line. As one skilled in the art will appreciate, consistency is critical and thus there is a tremendous desire for maintaining a constant relationship between the disc opener, the delivery channel, and the plane of the planting surface. Generally, this relationship has been maintained, or at least attempted to, by a parallel link system that keeps the components level with the frame or, more commonly, by a long trailing arm mount to reduce angular variation during elevation changes while, ideally, the components should remain normal to the planting surface. A depth setting wheel adjacent the disc opener is then used to adjustably set the depth that the disc opener penetrates the planting surface. Providing support for these components that accommodates the needed range of vertical motion has been found to be relatively difficult and costly.

Further, conventional single disc openers are angled to the direction of travel at an angle between five and seven degrees. The angling of the disc openers allows the disc openers to cut a slash through the planting surface wide enough to introduce seed and/or fertilizer into the cut surface. The angling, however, has been found to result in a relatively large side load on the mounting mechanism used to mount the disc opener to the carrier boom. As such, conventional implements have required robust and costly bushings in the mounting mechanism to counter the side loading.

Conventional implements have a frame or chassis to which multiple sets of disc openers will be mounted. To provide a broad width of coverage and thus limit the number of passes required to prepare a planting surface, some of the disc openers will be mounted to wing booms that extend laterally away from the central frame. However, when in transport, it is desired to narrow the overall width of the implement and, as such, the wing booms are generally lifted and folded to a transport position over or adjacent the central frame. The central frame is supported by front and rear wheel units that are sized to handle the load placed thereon by the central frame and the wing booms during transport. The disadvantage of this system is the separate hydraulics required to, on one hand, apply pressure to the openers in field position, and on another hand, swing their mount frames into transport position.

SUMMARY OF THE INVENTION

The present invention overcomes the aforementioned drawbacks by providing a disc gang for use with an agricultural implement that includes a pair of front and a pair of rear disc openers mounted to a carrier boom by a mounting arm that can be independently raised and lowered as desired. The front and rear disc openers are mounted such that the openers can oscillate in response to surface undulations independently of one another. Moreover, the disc openers of each pair are free to oscillate in response to surface contours independently of one another.

Some of the aforementioned advantages of the present invention are particularly well illustrated in FIGS. 1A through 3B, which compare the functionality of one embodiment of the present invention (FIGS. 1A, 2A, and 3A) with a conventional implement (FIGS. 1B, 2B, and 3B). As shown in FIGS. 1A and 1B, during operation on a level planting surface, operation of an implement according to the invention (FIG. 1A) is similar to that of a conventional implement (FIG. 1B). However, when a severe decline terrain condition is encountered, the present invention allows the disc openers to maintain contact with the planting surface, as shown in FIG. 2A, whereas when a conventional implement encounters such a downhill terrain condition, the disc openers are lifted off the ground, as shown in FIG. 2B due to their relatively limited range of travel. In the example illustrated in FIG. 2A, the disc openers have lowered far beyond the travel of a conventional opener to maintain contact with the planting surface. As also illustrated in FIG. 2A, in addition to the adjusting for the elevation change, the present invention allows the carrier mount to which the disc gangs are mounted to pivot such that the forward and rearward disc openers maintain contact with the planting surface.

As illustrated in FIG. 3A, when a severe incline condition is encountered, the carrier arm rotates upward relative to the carrier boom allowing the disc openers to rise rather than dig into the planting surface as can be the case with conventional implements, as shown in FIG. 3B. Digging into the planting surface can create inconsistencies in the cutting depth across the planting surface as well as expose the disc openers and other components to potentially damaging loads. In the illustrated example, the disc openers have been raised beyond the travel of conventional opener to accommodate the terrain change.

It will be appreciated that by pairing opposite left and right openers the side-by-side relationship of each pair negates the side loading impact that is generally found with conventional implements. That is, because the disc openers of a given pair share a common mount, the side load placed on one disc opener is cancelled by the other disc opener of the pair.

BRIEF DESCRIPTION OF THE DRAWINGS

Preferred exemplary embodiments of the invention are illustrated in the accompanying drawings in which like reference numerals represent like parts throughout.

In the drawings:

FIG. 8 is a schematic plan view of an agricultural implement outfitted with multiple disc gang assemblies according to another aspect of the invention.

DETAILED DESCRIPTION OF THE PREFERRED EMBODIMENTS

Figure 1A:
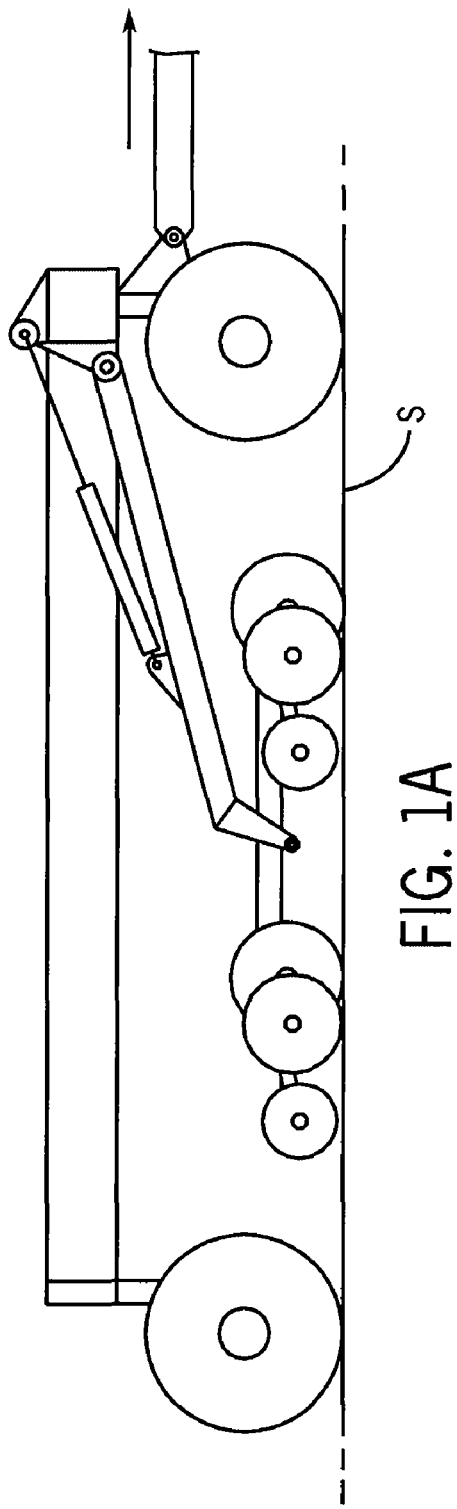
FIG. 1A is a schematic side elevation view of a disc gang assembly according to one aspect of the invention shown relative to a level terrain condition.
Figure 1B:
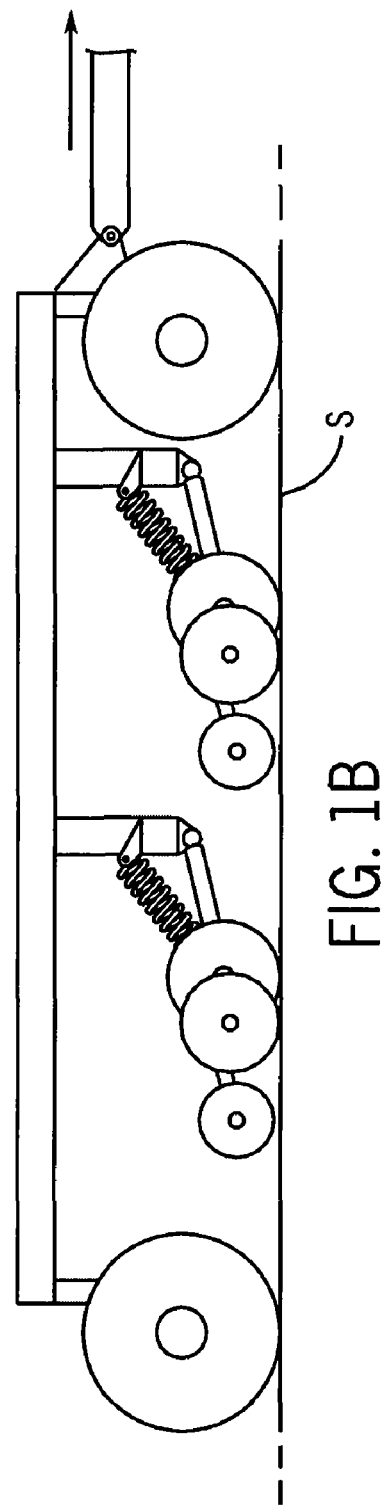
FIG. 1B is a schematic side elevation view of a known disc gang assembly shown relative to a level terrain condition.
Figures 2A, 2B:
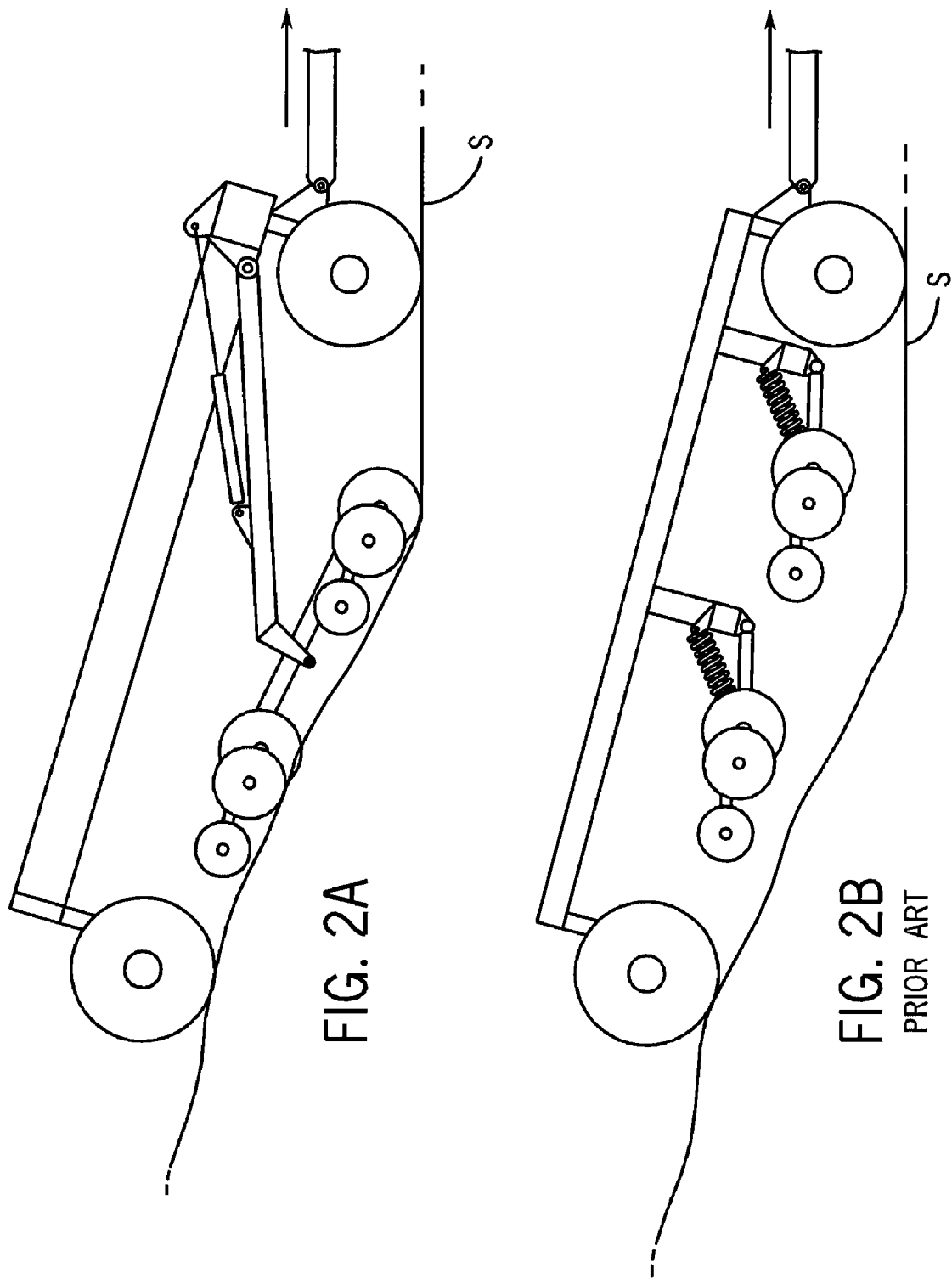
FIG. 2A is a schematic side elevation view of the disc gang assembly of FIG. 1A shown relative to a downhill terrain condition.
FIG. 2B is a schematic side elevation view of the disc gang assembly of FIG. 1B shown relative to the downhill terrain condition.
Figures 3A, 3B:
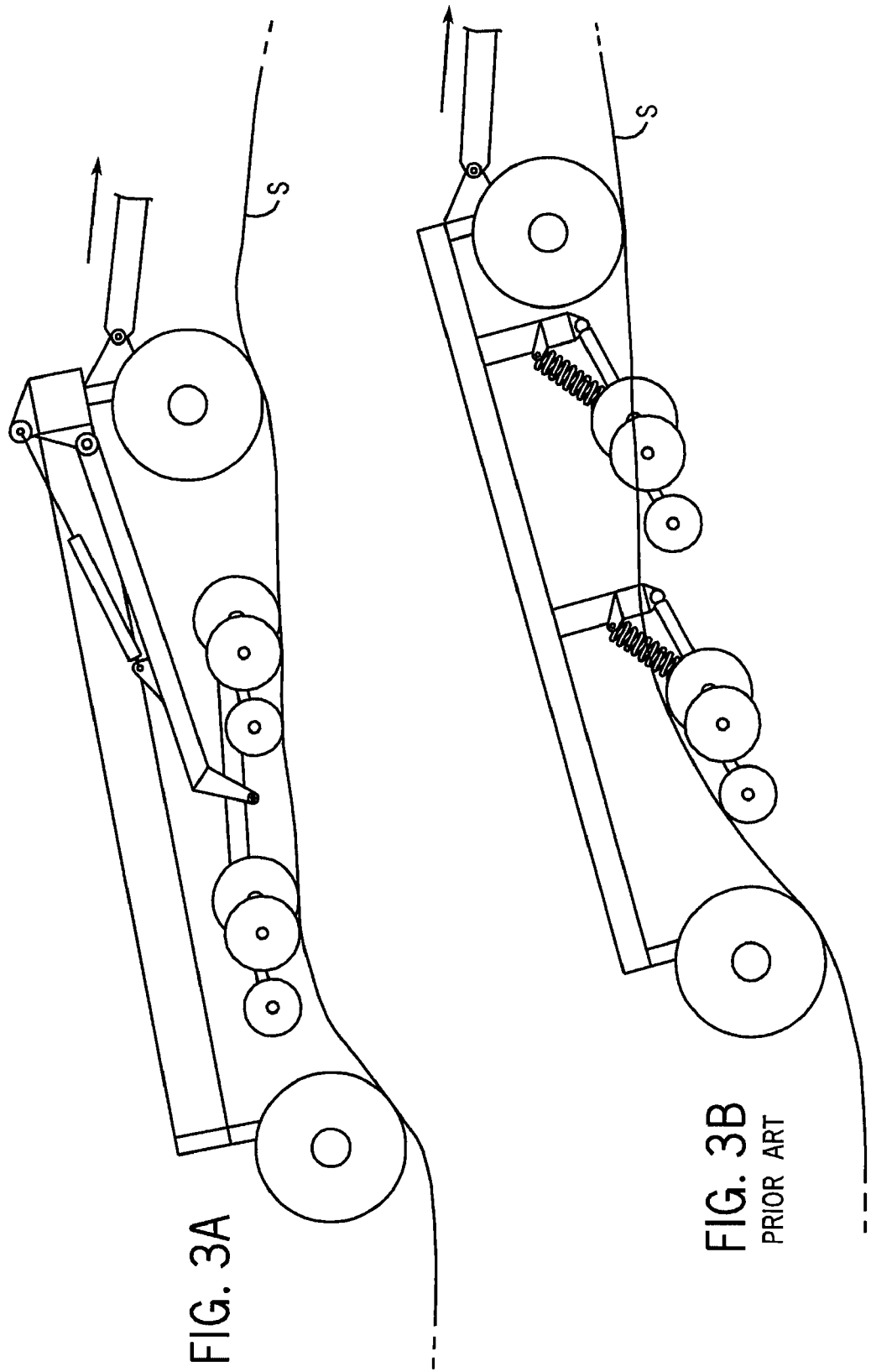
FIG. 3A is a schematic side elevation view of the disc gang assembly of FIG. 1A shown relative to an uphill terrain condition.
FIG. 3B is a schematic side elevation view of the disc gang assembly of FIG. 1B shown relative to an uphill terrain condition.
Figure 4:
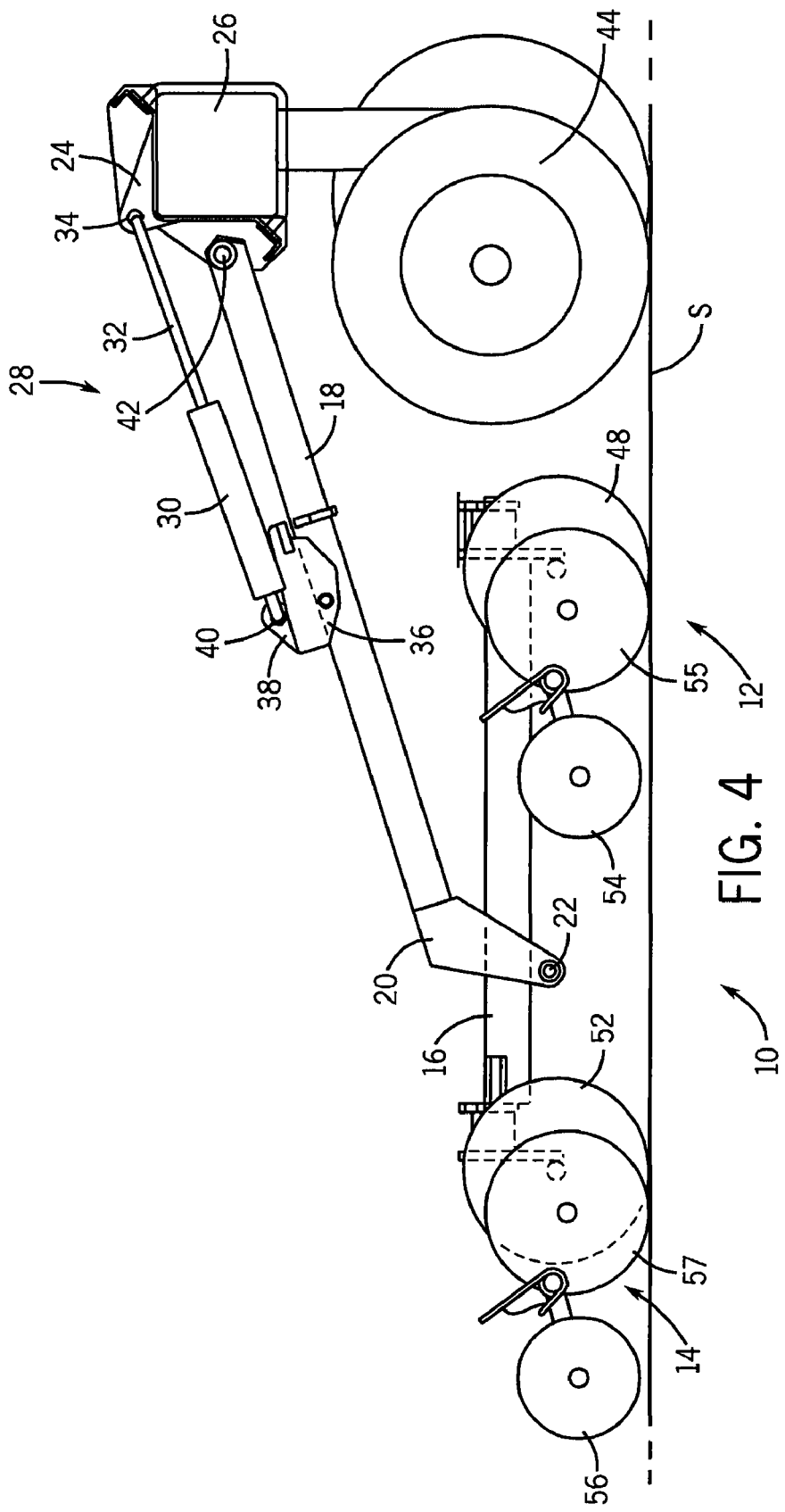
FIG. 4 is a side elevation view of a disc gang assembly according one embodiment of the present invention.
Figure 5:
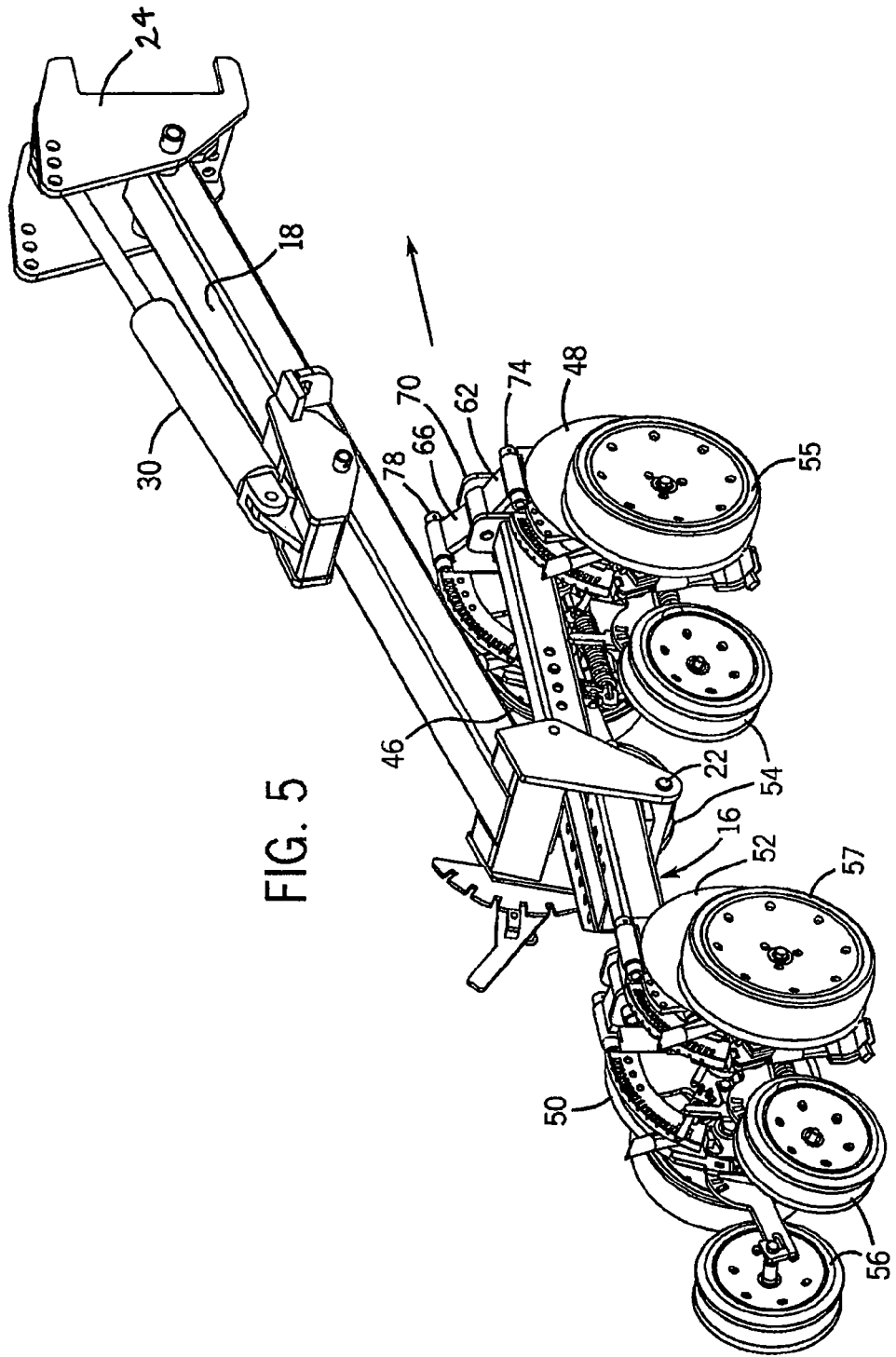
FIG. 5 is an isometric view of the disc gang assembly shown in FIG. 4.
Figure 6:
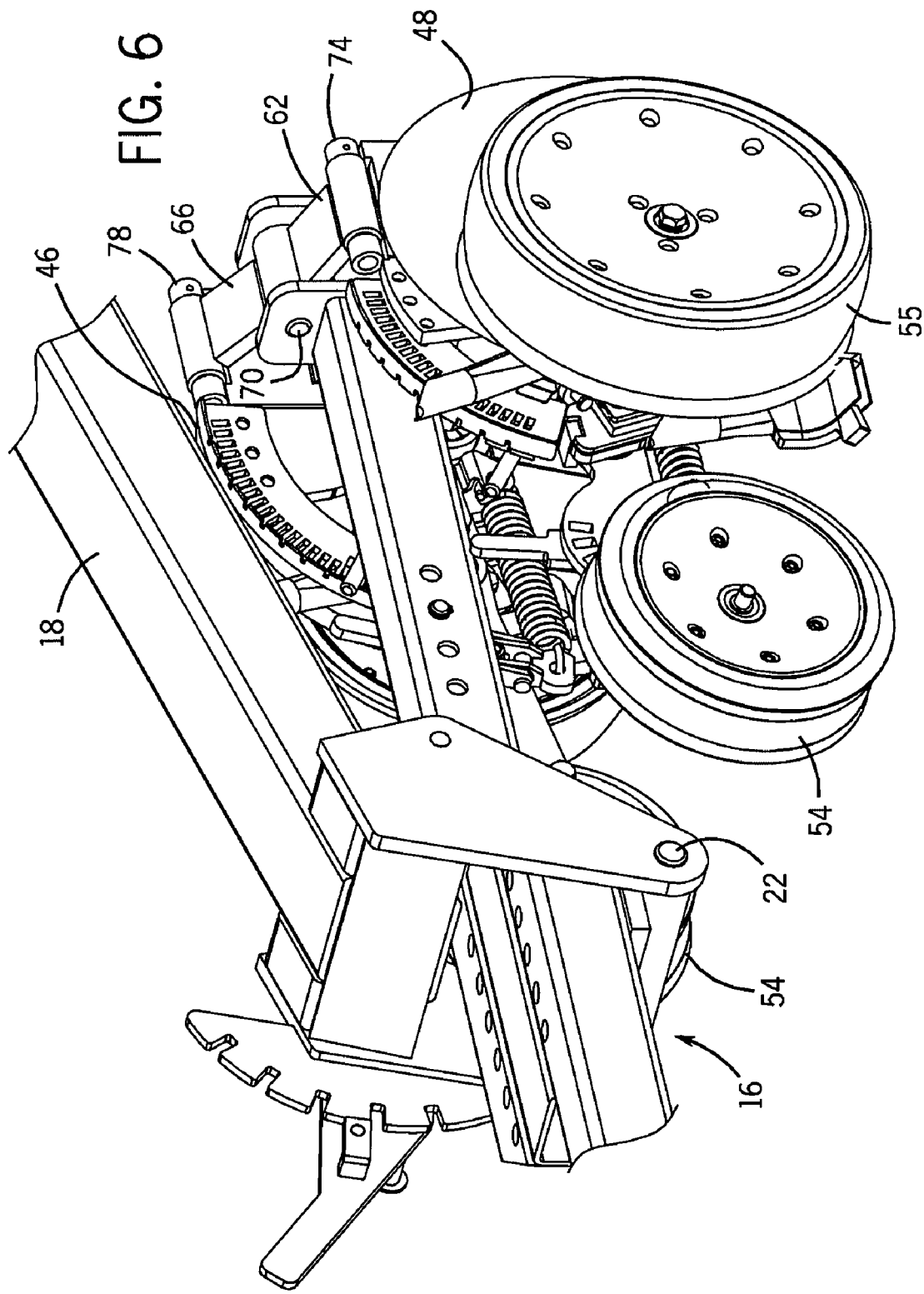
FIG. 6 is an enlarged isometric view of the front of the disc gang assembly shown in FIG. 5.

The present invention will be described with respect to a single disc gang consisting of four disc openers and, more particularly, two pairs of disc openers, mounted to a carrier boom. It is understood however that multiple sets of such disc gangs may be mounted along the length of the carrier boom at a desired spacing. Unless otherwise noted, each of the disc gangs will be similar to that described herein.

Turning now to FIGS. 4 through 7, a disc gang 10 generally includes a forward pair of disc openers 12 and a rearward pair of disc openers 14. The pairs of disc openers 12, 14 are mounted to a mount 16 that is attached to a carrier arm 18 by a bracket 20. The bracket pivotally attaches to the gang 10, shown in one embodiment pivoting about pin 22. While a pivoted pin 22 is shown, it is contemplated that other types of linkages may be used to facilitate movement of the mount 16 relative to the carrier arm 18. Opposite bracket 20, the carrier arm 18 is attached to a mount bracket 24 that is coupled to a carrier boom 26. As shown in the figures, in one embodiment, the carrier boom consists of a square tube. Interconnected between the carrier arm 18 and the mount bracket 24 is an actuator 28 that generally comprises a hydraulic cylinder 30 and a ram 32. The ram 32 is attached to the mount bracket 24 by pin 34. The cylinder 30 is attached to a pivot arm 38 by pin 40 which allows the actuator 28 to lift and lower the disc gang 10 via elevation of the carrier arm 18. In one embodiment, the pivot arm 38 has a pair of flanges 36 that are pinned to opposite sidewalls of the carrier arm 18. As shown in the figures, the carrier arm is attached to the mount bracket 24 via pin 42. The pinned connections heretofore described allow the carrier arm 18 to pivot relative to the carrier boom 26 to lift and lower the disc gang 10. The carrier boom 26 is supported above the planting surface by a wheel unit 44.

The forward pair of disc openers includes disc openers 46 and 48 whereas the rearward pair of disc openers includes disc openers 50 and 52. Each pair of disc openers 12, 14 has a pair of trailing packer wheels 54, 56, respectively. In addition, there is a pair of depth gauge wheels 55, 57 associated with each pair of disc openers 12, 14.

Figure 7:
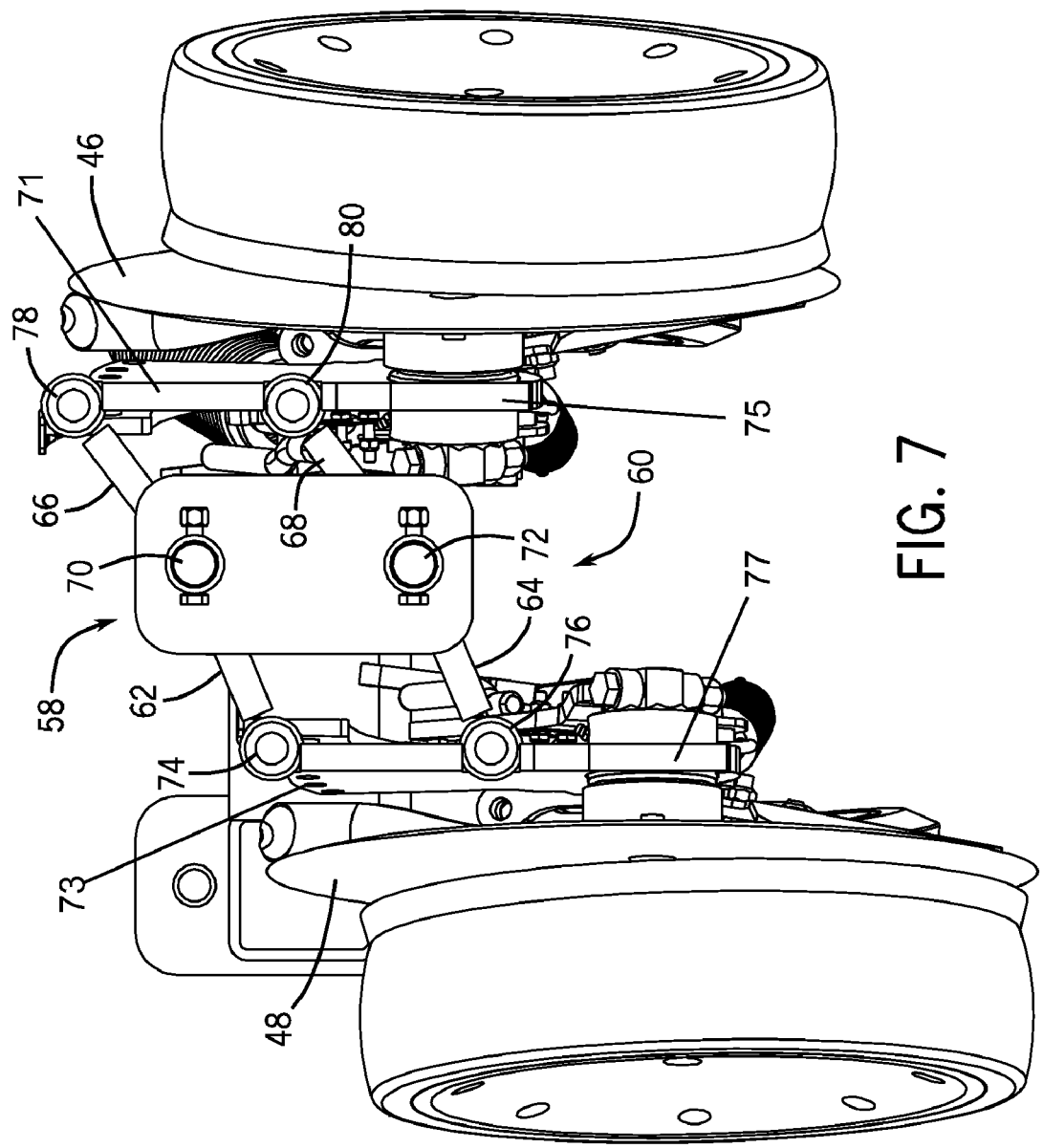
FIG. 7 is a front elevation view of the disc gang assembly according to one aspect of the present invention.

Disc openers 46, 48 are mounted to the mount 16 by a pair of parallel mounts 58, 60, respectively. Parallel mount 58 has a pair of mounting arms 62, 64 and parallel mount 60 also has a pair of mounting arms 66, 68. The parallel mounts 58, 60 are mounted to the mount 16 by pins 70, 72. In a similar manner, the disc openers 46, 48 include disc supports 71 and 73, which are connected at transverse connectors 75 and 77 to disc openers 46, 48, respectively, as best shown in FIG. 7. Disc opener 46 is mounted to parallel mounting arms 66 and 68 by pins 78, 80, respectively, positioned in disc support 71. Disc opener 48 is mounted to parallel mounting arms 62, 64 by pins 74, 76, respectively, positioned in disc support 73. The pinned connections allow the parallel mounting arms to move in response to the disc openers 46, 48 encountering surface undulations. Similarly the front opener pair can move relative to the rear opener pair by pivoting around pin 22. Thus, as one disc opener encounters an undulation in the planting surface S, that disc opener can respond accordingly without affecting the placement of the side-by-side disc opener or the disc openers of the other pair of disc openers.

While the mounting of the forward disc openers 46, 48 has been described it is understood that the disc openers 50, 52 of the rearward pair of disc openers is similarly mounted to the mount 16.

As shown in the figures, the disc openers within each pair are generally side by side but mounted to a shared mount. This configuration provides side loading cancellation such that any side loading is local.

It is understood that multiple sets of disc gangs such as those described herein may be mounted to the carrier boom by dedicated carrier arms having associated actuators. This independence in the mounting of the disc openers allows the disc openers of a given disc gang to rise and fall independently of the other disc gangs mounted to the carrier boom. In addition, oscillation of a disc opener of a given disc gang does not result in a similar oscillation of a disc opener of another disc gang mounted to the carrier boom. Thus, each opener independently encounters and reacts to a surface undulation or contour. One skilled in the art will thus appreciate that surface contact of the disc openers along the length of the carrier boom is generally maintained despite variations in surface terrain along the length of the carrier boom.

Moreover, the actuator associated with each disc gang provides a uniform vertical force onto the disc openers of its associated disc gang independent of the vertical position of the other disc gangs. Further, the actuator may be used to lift its disc gang to a transport position rather than a separate transport cylinder.

As shown in FIG. 8, one skilled in the art will appreciate that the carrier mount 26 maybe coupled to a tow bar 82 via draft links 84, 86. As known in the art, the two bar 82 can be coupled to a hitch 88 in a conventional manner. As further shown, the present invention advantageously removes the need for rear wheel units for the wing booms 88, 90. In this regard, center section 92 is supported by front wheel units 44 and rear wheel units 94, whereas the wing booms 88, 90 only have front wheel units 96, 98, respectively.

It is understood that the implement may include a control center that allows an operator to independently adjust the downward force applied to the actuators to set a desired down-pressure Additionally, while the invention has been described with respect to disc openers or coulters, it is understood that the invention could be used with other types of agricultural devices such as but not limited to knives, sweeps, blades, chisels, shanks, cultivators, and other tillage, furrowing or soil preparation tools.

Many changes and modifications could be made to the invention without departing from the spirit thereof. The scope of these changes will become apparent from the appended claims.

We claim:

1. An agricultural implement comprising:
   a carrier boom;
   a disc mount coupled to the carrier boom, the disc mount including first and second sides; and
   a pair of disc openers mounted to the disc mount, the disc mount positioned between the pair of disc openers, the pair of disc openers including a first disc opener positioned on the first side of the disc mount and a second disc opener positioned on the second side of the disc mount, at least a portion of each disc opener coupled to the disc mount by a pair of movable mounting arms;
   wherein the first and the second disc openers are free to move independent of the disc mount in response to changes in terrain contours such that a side load applied to one of the disc openers is canceled by the other one of the disc openers.

2. The agricultural implement of claim 1 wherein the pair of disc openers is a first pair of disc openers and wherein the agricultural implement further comprises a second pair of disc openers mounted to the disc mount aft of the first pair of disc openers.

3. The agricultural implement of claim 2 wherein each disc opener includes a disc support and the mounting arms are connected to at least a portion of the disc support.

4. The agricultural implement of claim 2 wherein the disc openers of the second pair of disc openers are allowed to independently follow the terrain.

5. The agricultural implement of claim 1 further comprising an actuator connected to the carrier boom and the disc mount, and operative to lift and lower the disc mount for raising the disc openers to a transport position and provide a variable down force.

6. The agricultural implement of claim 1, wherein the moveable mounting arms are positioned parallel to each other.

7. The agricultural implement of claim 1 wherein the moveable mounting arms are pivotable.

8. An agricultural implement comprising:
   a tool bar adapted to be towed by a towing vehicle;
   a carrier boom coupled to the tool bar;
   a first mounting arm and a second mounting arm connected generally spaced from and parallel with one another to the carrier boom;
   a first set of four disc openers mounted to the first mounting arm, the first set of four disc openers includes a first pair and a second pair of disc openers mounted aft of the first pair; and
   a second set of four disc openers mounted on the second mounting arm, the second set of four disc openers include a third pair and a fourth pair of disc openers mounted aft of the third pair,
   wherein at least a portion of each disc opener is coupled to its respective disc mount by a pair of movable transverse mounting arms, and
   wherein each pair of disc openers includes a first disc opener and a second disc opener which respond to changes in terrain contours independently of each other.

9. The agricultural implement of claim 8 further comprising a first hydraulic actuator associated with the first mounting arm and a second hydraulic actuator associated with the second mounting arm, and wherein the hydraulic cylinders allow independent motion to follow the terrain while ensuring uniform down-force.

10. The agricultural implement of claim 8 wherein the movable transverse mounting arms are pivotable.

11. The agricultural implement of claim 10 wherein the moveable transverse mounting arms are positioned parallel to each other.

12. The agricultural implement of claim 8 wherein each disc opener includes a disc support and the mounting arms are connected to at least a portion of the disc support.

* * * * *